United States Patent [19]

Richard et al.

[11] Patent Number: 4,862,592
[45] Date of Patent: Sep. 5, 1989

[54] WRITE HEAD FOR A DRAWING MACHINE HAVING A DEFORMABLE MOUNTING FOR A WRITING MEMBER

[75] Inventors: Jean-Louis Richard, Torcy; Remy Jaffres, Unieux, both of France

[73] Assignee: Schlumberger Industries, Montrouge Cedex, France

[21] Appl. No.: 175,045

[22] Filed: Mar. 30, 1988

[30] Foreign Application Priority Data

Apr. 10, 1987 [FR] France ................. 87 05166

[51] Int. Cl.4 ............................................. B43L 13/00
[52] U.S. Cl. .................................................... 33/18.1
[58] Field of Search ...................... 346/139 R, 141, 94; 33/18.1, 23.11, 32.3, 32.1, 18.2

[56] References Cited

U.S. PATENT DOCUMENTS

| 3,127,678 | 4/1964 | Muldoon | 346/139 R |
| 4,502,797 | 3/1985 | Hilpert et al. | |
| 4,559,717 | 12/1985 | Scire et al. | |
| 4,604,007 | 8/1986 | Hall et al. | 33/23.11 |

FOREIGN PATENT DOCUMENTS 2616128 4/1976 Fed. Rep. of Germany .
096085 6/1982 Fed. Rep. of Germany .

Primary Examiner—Harry N. Haroian
Attorney, Agent, or Firm—Ladas & Parry

[57] ABSTRACT

A write head for an X-Y plotter comprises a write head body (10) movably mounted in a horizontal direction relative to a write medium (14) and a pen (30) movably mounted in a vertical direction with respect to the head body (10) between pen-up and pen-down positions. The mounting for the pen (30) allows movement with respect to the head body and (10) comprises a parallelogram-shaped deformable element (20) made out of molded plastic material. This deformable element has a first side portion (21) attached to the head body, a second side portion (22) supporting the pen and two parallel arms (23, 24) pivotally linking the first and second side portions through horizontal hinge portions of reduced thickness (23a, 23b, 24a, 24b). An actuator (40) has a permanent magnet (44) fixed to the head body and a coil (42) fixed to the second side portion and moves the pen between pen-up and pen-down positions.

8 Claims, 2 Drawing Sheets

WRITE HEAD FOR A DRAWING MACHINE HAVING A DEFORMABLE MOUNTING FOR A WRITING MEMBER

The present invention relates to a write head for a drawing machine, and more particularly it relates to a write head of the type comprising a head body which is movable relative to a write medium in order to produce a line thereon by relative displacement between the head and the write medium, mounting means for movably mounting a writing member on the head body, and actuator means for displacing the writing member between a rest position away from the write medium and a working position in which the writing member is producing a trace on the write medium.

Drawing machines, or plotters, of this type are well known. In general, the write head comprises a body such as a carriage which is movable in translation along a first direction (Y) relative to the write medium, while the write medium is engaged with drive means for displacing it along a second direction (X) perpendicular to the first. The desired line is produced on the write medium by an appropriate combination of write head movements and of write medium movements in the Y and X directions, respectively.

Obtaining lines quickly and accurately requires quick moves of the writing member or pen between its rest position and its working position, and the writing member must be guided at least when in its working position in contact with the write medium. In many machines, these displacements take place vertically relative to a write medium (paper) which is positioned on a horizontal platen surface. That is why the following description makes use of the term "vertical" for convenience when designating the displacements of the writing member between its rest position and its working position.

In some prior machines, the writing member is fixed to a support and the entire pen and support assembly is movable relative to the head body in order to provide the vertical displacements of the member.

In other prior machines, in order to reduce the mass which is moved during these vertical displacements only the pen is movable vertically and it is guided over the head body.

The object of the present invention is to provide a simplified write head structure in which the vertical displacements of the writing member are fast and accurate.

This object is achieved by means of a write head of the type defined at the beginning of the present description and in which, according to the invention, the writing member is mounted to the head body by a simple linkage mechanical assembly.

To this end, the write member mounting means is preferably in the form of a deformable parallelogram having a first side fixed to a write head body parallel with the general direction of the writing member displacement between its rest position and its working position, a second side which is parallel to the first side and which is fixed to the writing member and two parallel arms pivotally mounted to the first and second sides such that the writing member is movable along the general direction and is maintained parallel to said general direction.

Advantageously, the mounting means of the write head is a single piece made by molding a plastic material with each arm having a thin, hinge-constituting, deformable portion in the vicinity of each end.

This embodiment has a first advantage of being simple and suitable for manufacturing at a very low cost. Further, the hinges have no slack nor do they have any dry friction, and they are insensitive to dirt.

This embodiment also has the advantage of being lightweight which is important given the response time when raising and lowering the writing member.

It should also be observed that the simplicity of the proposed write head structure helps minimize assembly operations.

The writing member is guided between its rest position and its working position by being kept parallel with the first side of the parallelogram which is fixed to the head body, with displacements of the writing member between said positions being controlled by any appropriate type of actuator means, for example mechanical or electromagnetic means, including a moving member which acts on the writing member or on the movable side of the mounting means in order to deform the mounting means.

The invention will be better understood from the following description given by way of non-limiting example with reference to the accompanying drawings, in which.

Figure 1:
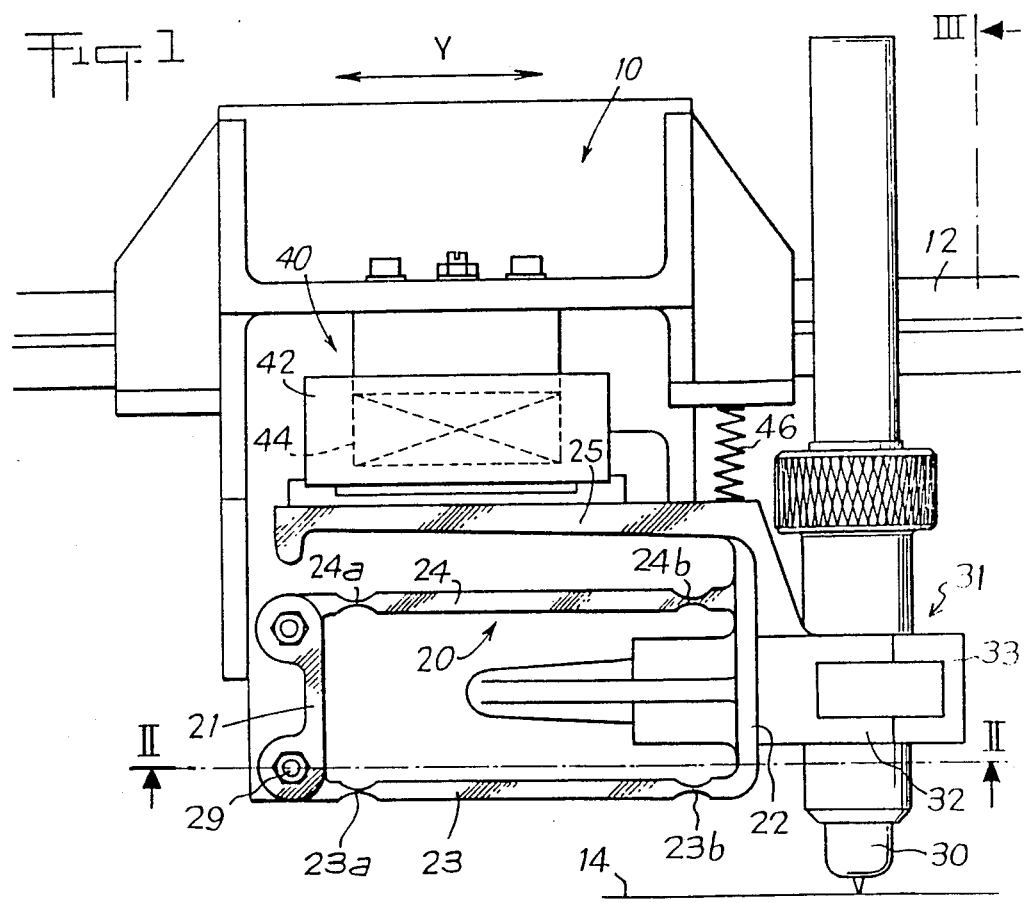
FIG. 1 is a diagrammatical side elevation view of a portion of a drawing machine having a write head which constitutes an embodiment of the invention.
Figure 2:
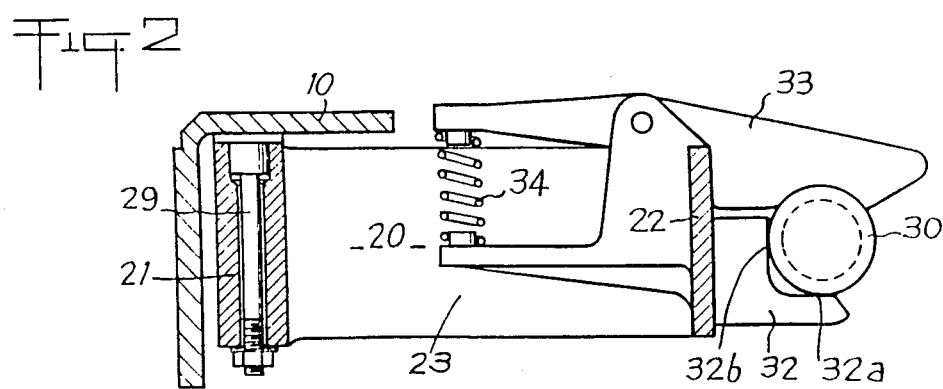
FIG. 2 is a section along line II—II of FIG. 1.
Figure 3:
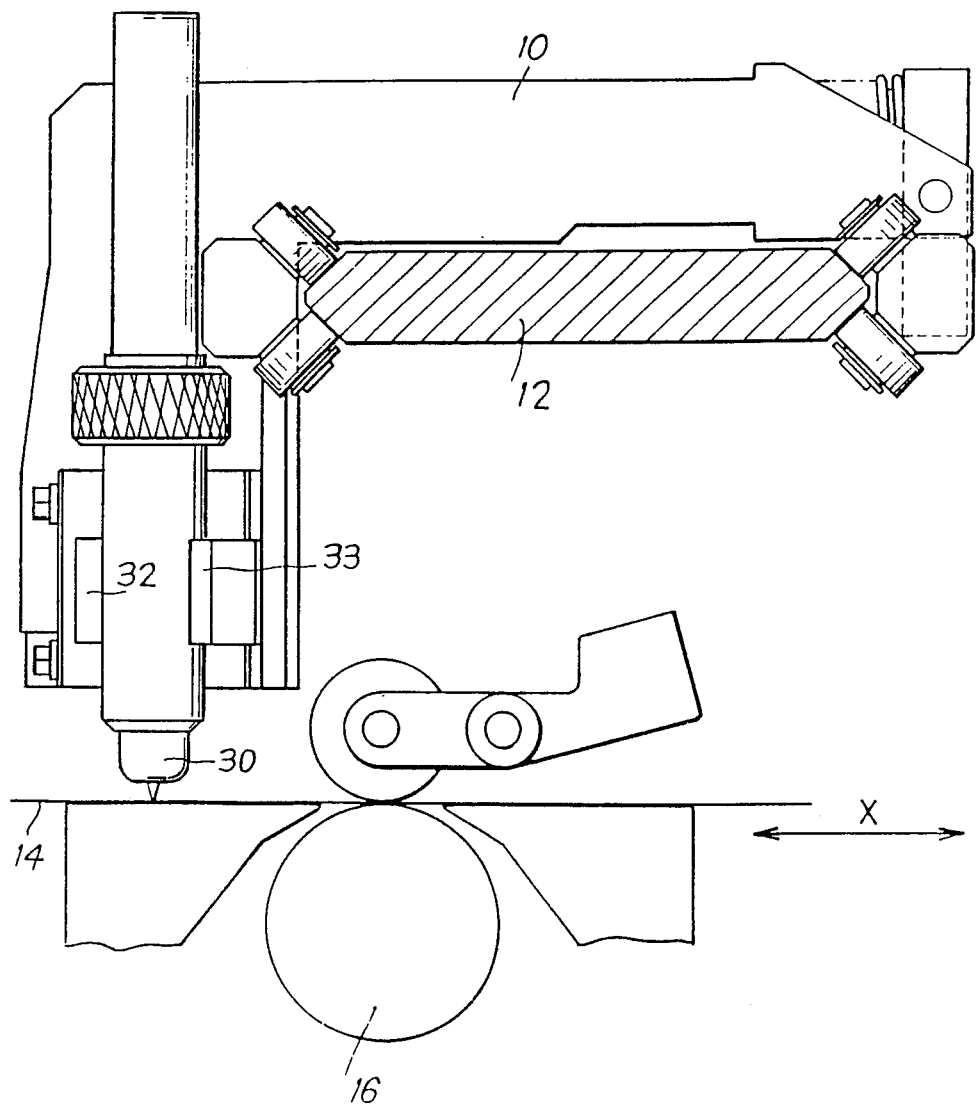
FIG. 3 is a section along line III—III of FIG. 1.

The write head shown in FIGS. 1 to 3 essentially comprises a carriage 10 constituting a write head body which is movable in translation along a rail 12, a writing member or pen 30 carried by the head body 10, and mounting means 20 for mounting the writing member for vertical displacement relative to the head body 10. An actuator 40 is acting on the writing member 30 in order to control vertical displacements of the writing member between a raised (rest) position and a lowered (working) position.

In the working position, as shown in FIGS. 1 to 3, the writing member 30 is in contact with a write medium such as a sheet of paper 14. A given trace is produced on the sheet 14 by combining motion of the carriage in translation along the rail 12 (Y direction) with motion of the sheet 14 (X direction) as driven by a drum 16 which is rotated about an axis extending parallel to the Y direction.

The displacement of the carriage 10 in the Y direction may be controlled by any appropriate means, for example by an endless cable or chain or by a linear motor as described in French patent No. 86 07 743. The sheet 14 is driven by the drum 16 in the X direction which is perpendicular to the Y direction by means of sprockets mounted on the drum which penetrate into side holes regularly spaced apart along two parallel sides of the sheet, or else the sheet may be driven by friction with the sheet being pressed against the drum by means of pressure wheels, as described, for example, in French patent No. 86 00 637.

In accordance with the invention, the vertical displacements of the writing member are obtained by deforming the mounting means 20 of the write head. The mounting means 20 has the structure of a deformable parallelogram with a rear portion or side element 21 which is fixed to the carriage, e.g. by means of screws 29, a front portion or second side element 22 on which the writing member is attached in a vertical position, and two parallel arms 23 and 24 pivotally mounted to the portions 21 and 22 and respectively constituting a bottom arm and a top arm. The rear portion 21 extends parallel to the direction in which the writing member 30 is displaced between the rest position and the working position (i.e. in this case it extends vertically). The arms 23 and 24 each have respective reduced-thickness portions 23a and 24a in the vicinity of their ends connected to the rear portion 21, and respective reduced-thickness portions 23b and 24b in the vicinity of their ends connected to the front portion 22. The reduced-thickness portions 23a and 24a constitute hinges which are fixed relative to the carriage and which serve to enable the respective arms to pivot about two parallel horizontal axes, while the reduced-thickness portions 23b and 24b constitute hinges which move relative to the carriage enabling pivoting to take place about axes which are likewise horizontal and which are parallel to the above-mentioned axes. By virtue of this deformable parallelogram structure, the front portion 22 of the mounting means 20 together with the writing member 30 which is fixed thereto are capable of moving by deformation of the mounting means 20 in a direction which remains constantly vertical, parallel to the rear portion 21.

The mounting means 20 is advantageously molded as a single piece of plastic material such as polypropylene.

The writing member 30 has a cylindrical body which bears against vertical walls formed on the front portion 22 of the head body. The writing member may be fixed on the body 20 by various different magnetic or mechanical means. Preferably, fixing means are used which enable the writing member to be removed merely by applying horizontal traction, thereby enabling the writing member to be changed automatically.

In the example shown, the fixing means comprise a clamp 31 having a fixed jaw 32 and a moving jaw 33. The fixed jaw 32 is fixed to the front portion 22, e.g. by being integrally molded therewith, and it defines a V-section housing having two vertical surfaces 32a and 32b constituting thrust surfaces for the cylindrical body of the writing member. The moving jaw 33 is hinged to the front portion 22 about a vertical axis. The moving jaw 33 presses the body of the writing member against the vertical surfaces 32a and 32b under the action of a spring 34 which acts on the moving jaw 33 and which bears against the fixed jaw 32.

The actuator 40 comprises a movable portion 42 attached to an arm 25 which is an integral portion of the front portion 22. As can be seen in FIG. 1, the arm 25 extends over the top arm 24 of the parallelogram, and is attached to the front portion 22 of the mounting means. A traction spring 46 having one end fixed to the carriage 10, the other end fixed to the front portion 22 of the mounting means 20 exerts a bias force on the front portion 22 for returning the writing member to its rest position when the machine is switched off (i.e. when the actuator is not activated). The spring 46 is designed to exactly counterbalance the weight of the writing member 30 and of portions 22, 25, 42 and 31, and has no significance effect during writing.

The actuator 40 may be of any appropriate mechanical, electromechanical or electromagnetic type, for example it may be an electromagnet, a device having a plunging core, or a device having a coil which moves in a field, with a fixed portion being connected to the carriage and with a movable portion 42 being connected to the arm 25. In the example shown, the actuator 40 is of the electromagnetic type, including an assembly 44 which is mounted on the carriage 10 and which comprises a mild steel pole piece with two permanent magnets fixed thereto. The movable portion 42 comprises a coil which is vertically movable in the field set up by the assembly 44 in response to a current being passed through the coil, with the coil being displaced upwardly or downwardly depending on the direction of the current passing therethrough.

When the coil 42 is powered to be displaced downwardly, it deforms the mounting means 20 so as to bring the writing member 30 into the working position. The member 30 remains in the working position so long as the coil is powered in this way. The writing member 30 returns to the rest position by reversing the direction of current flow through the coil 42.

Insofar as the spring 46 is designed to exactly balance the weight of the writing assembly, it is necessary to use the actuator for returning the writing member to the rest position in order to ensure that the member is raised rapidly and accurately.

Otherwise, the deformation of the mounting means on moving from one of the rest and working positions to the other of said positions could be resilient in nature. In the example shown, the mounting means is in its rest or non-deformed state when the writing member is in the working position, thereby exerting no force on the writing member while it is writing, which would not be the case if the mounting means were resiliently deformed. Naturally, the rest shape of the mounting means could be designed to correspond to some other position of the writing member.

We claim:

1. A write head for a drawing machine comprising:
a head body mounted for movement in a first direction over a rite medium;
a writing member deformable means on said body for movably mounting said writing member in a second direction relative to said head body between a rest position away form said write medium and a working position in which said writing member is operative for producing a trace on said write medium, said deformable means comprising a first side member fixed to said body; a second side member supporting said writing member; first and second arm members disposed parallel to each other; and flexible portions for pivotally mounted said arm members to said first and second side members such that said writing member can be displaced along said second direction while being maintained parallel to said second direction.

2. The write head of claim 1 wherein said first and second side members and said first and second arm members are portions of a single deformable element, said flexible portions comprising reduced thickness portions between each of said first and second arm members and each of said first and second side members, said reduced thickness portions pivotally mounting said first and second arms members with respect to said first and second side members.

3. The write head of claim 2 wherein said reduced thickness portions are extending longitudinally in a third direction perpendicular to said second direction for preventing movement of said writing member in said third direction.

4. The write head of claim 3 wherein said reduced thickness portions are parallel to said first direction.

5. The write head of claim 2 wherein said deformable element is made of molded plastic material.

6. The write head of claim 1 further comprising selectively operable actuating means for moving the writing member between said rest position and said working position.

7. The write head of claim 6 wherein said actuating means comprise permanent magnet fixed to said body and coil means fixed to said second side member for displacing said writing member between said rest and working position when said coil means are fed with electric current.

8. The write head of claim 1 further comprising means for releasably mounting said writing member to said second side member, said means for releasably mounting comprising gripping means movably mounted on said second side member between a position holding said writing member and a position releasing said writing member, and biasing means for urging said gripping means to said holding position.

* * * * *